US 6,690,865 B2

(12) United States Patent
Miyazaki

(10) Patent No.: US 6,690,865 B2
(45) Date of Patent: Feb. 10, 2004

(54) METHOD FOR ALIGNING LASER DIODE AND OPTICAL FIBER

(75) Inventor: Koichi Miyazaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 18 days.

(21) Appl. No.: 09/994,615

(22) Filed: Nov. 28, 2001

(65) Prior Publication Data

US 2002/0081075 A1 Jun. 27, 2002

(30) Foreign Application Priority Data

Nov. 29, 2000 (JP) ........................................ 2000-363282

(51) Int. Cl.[7] .............................. G02B 6/26; G02B 6/42; G02B 6/36
(52) U.S. Cl. .............................. 385/52; 385/90; 385/91
(58) Field of Search ........................ 385/49, 52, 88–91; 356/399, 400

(56) References Cited

U.S. PATENT DOCUMENTS

| | | | | |
|---|---|---|---|---|
| 4,884,015 A | * | 11/1989 | Sugimoto et al. | 318/640 |
| 5,623,337 A | * | 4/1997 | Iori et al. | 356/153 |
| 5,926,594 A | * | 7/1999 | Song et al. | 385/49 |
| 6,341,187 B1 | * | 1/2002 | Wu et al. | 385/52 |
| 6,470,120 B2 | * | 10/2002 | Green et al. | 385/52 |

FOREIGN PATENT DOCUMENTS

| | | |
|---|---|---|
| JP | 6-281850 | 10/1994 |
| JP | 8-94886 | 4/1996 |
| JP | 8-114725 | 5/1996 |
| JP | 8-262280 | 10/1996 |
| JP | 8-287149 | 11/1996 |

* cited by examiner

*Primary Examiner*—David V. Bruce
*Assistant Examiner*—Thomas R Artman
(74) *Attorney, Agent, or Firm*—Oblon, Spivak, McClelland, Maier & Neustadt, P.C.

(57) ABSTRACT

The invention provides a method for efficiently performing the alignment work of a laser diode chip with an optical fiber. A laser diode chip is faced to a coupling end face of a lensed fiber. According to algorisms stored inside an algorism storage part, X, Y and Z stages move the lensed fiber for alignment. The lensed fiber takes in laser light as it is moved in the optical axis direction (Z-axis direction) of the laser light from the laser diode chip. The lensed fiber is moved in the Z-axis direction by every movement, a half of a wavelength of the laser light, on the basis of the reference position thereof. Every time at the step moving, a light power of the laser light incident into the lensed fiber is measured. A position where the measured value becomes the maximum or a neighboring position thereof is defined as the optimum position of the optical fiber in the Z-axis direction. After rough alignment by whirl alignment, the optimum position of the optical fiber on the XY plane is determined by microalignment according to a five-point alignment method.

16 Claims, 11 Drawing Sheets

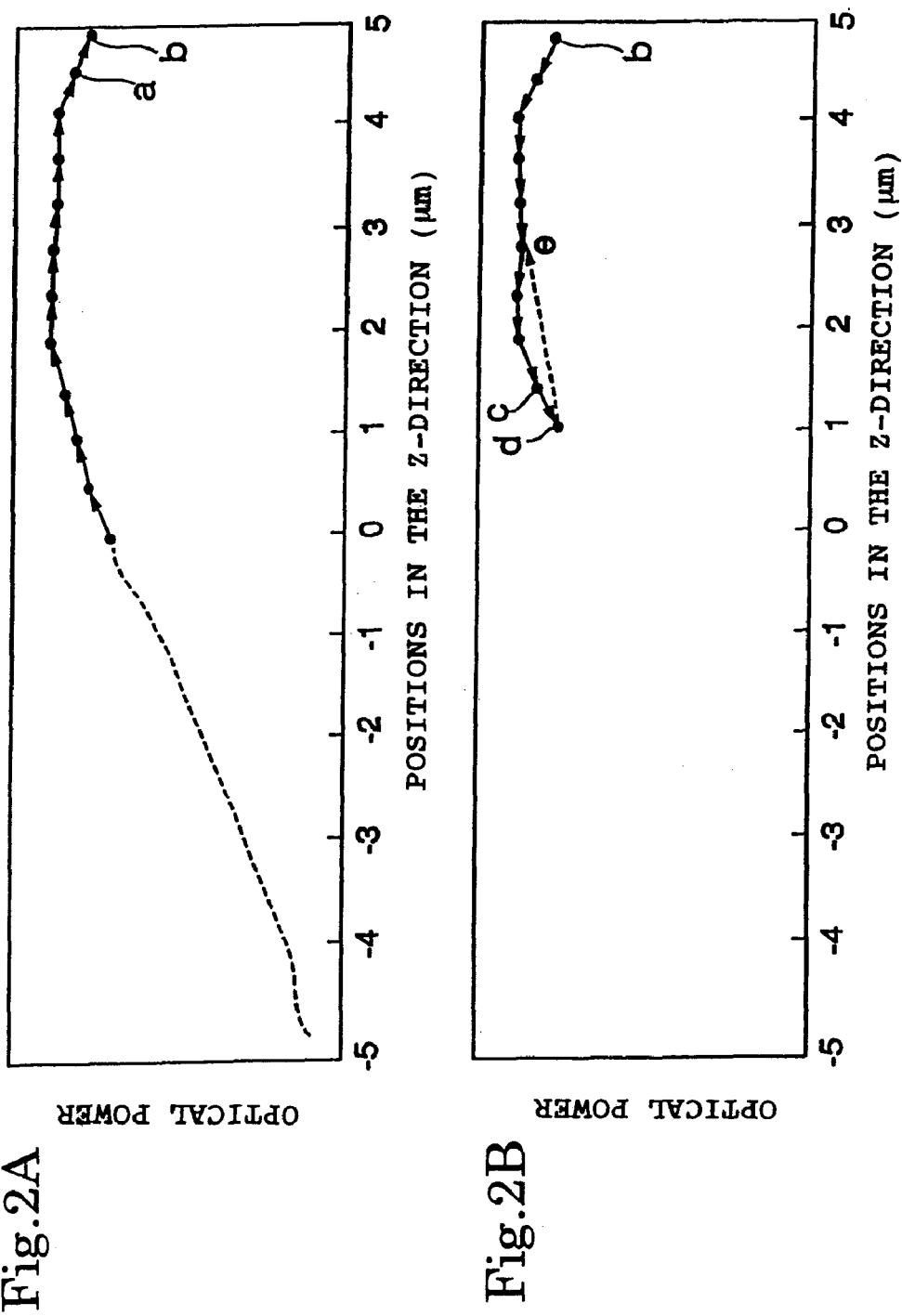

METHOD FOR ALIGNING LASER DIODE AND OPTICAL FIBER

BACKGROUND OF THE INVENTION

In the field of the optical communications, for example, a laser diode module is used in which a laser diode (LD) chip for outputting light is coupled to an optical fiber for emitting light from the laser diode chip to form a module. In fabricating this type of the laser diode module, a method for accurately and easily aligning the laser diode chip with the optical fiber is desired.

SUMMARY OF THE INVENTION

The present invention is to provide an alignment method of a laser diode chip with an optical fiber, an alignment apparatus adapted to the alignment method and a laser diode module aligned by employing the alignment method.

An alignment method of a laser diode chip with an optical fiber of the invention comprising the steps of:

facing the laser diode chip with a coupling end face of the optical fiber;

aligning a position in the Z direction where the optical fiber is aligned with the laser diode chip at a position in the Z-axis direction of an optical axis of the laser light; and aligning a position in the XY direction where the optical fiber is aligned with the laser diode chip at a position in the X direction and the Y direction on the XY plane of an X-axis and a Y-axis orthogonal to the Z-axis, wherein the step of aligning a position in the Z direction has the following steps of:

acquiring light power data at a Z position where the coupling end face of the optical fiber is moved relatively with respect to the laser diode chip in the Z-axis direction to measure a light power received by the optical fiber and light power data is acquired at every predetermined reference movement, in a state that the laser diode chip is faced to the coupling end face of the optical fiber; and setting an alignment position in the Z-axis direction where the alignment position for the optical fiber in the Z-axis direction is determined with respect to the laser diode chip based on the light power data at every predetermined reference movement.

BRIEF DESCRIPTION OF THE DRAWINGS

Exemplary embodiments of the invention will now be described in conjunction with drawings in which:

FIGS. 2A and 2B depict illustrations of the alignment operation of the laser diode chip with the optical fiber in the optical axis direction, employing the apparatus of the embodiment;

DETAILED DESCRIPTION

Figure 12A:
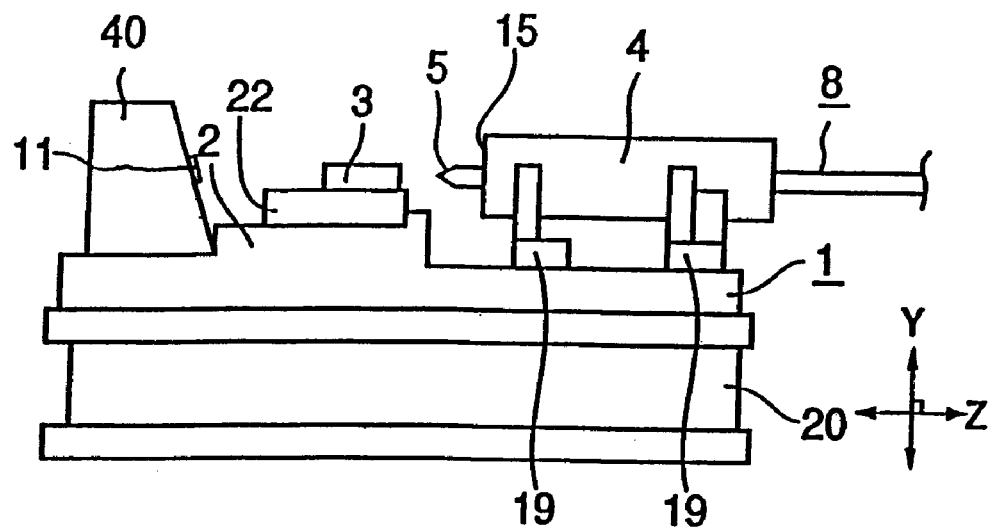
FIGS. 12A and 12B depict illustrations showing one example of a laser diode module where the laser diode chip and the optical fiber are aligned and assembled.
Figure 12B:
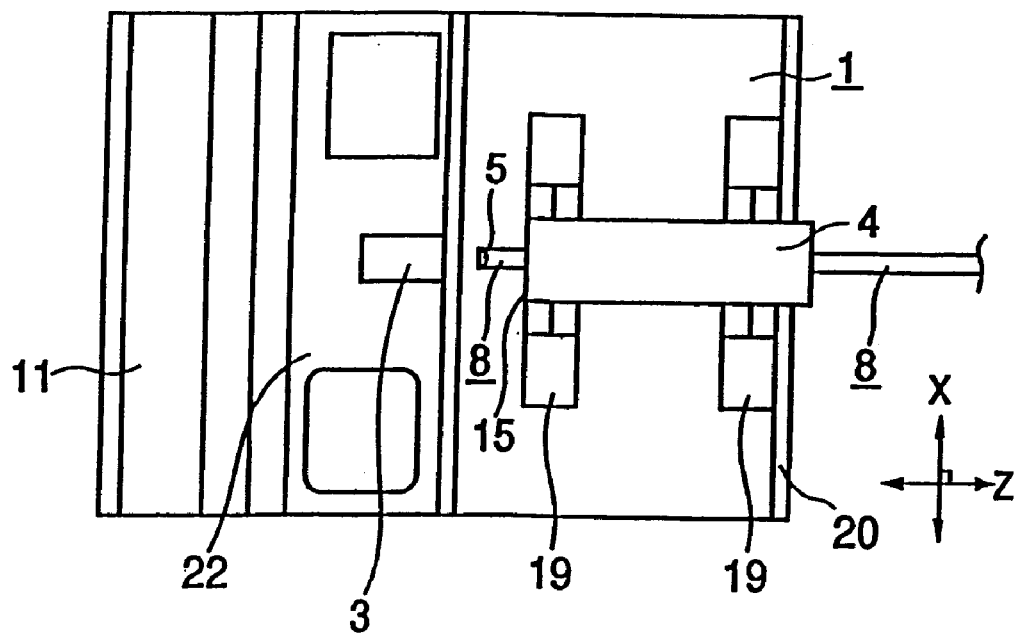

Laser diode modules are configured variously. FIGS. 12A and 12B depict one example of the laser diode modules. The laser diode module has a metal package, but the package is omitted in the drawing here. The laser diode module shown here is a type of a laser diode module comprised of a laser diode chip directly optically coupled to an optical fiber.

Additionally, FIG. 12A depicts a side configuration of the laser diode module and FIG. 12B depicts a plane configuration of the laser diode module. The structure shown in FIGS. 12A and 12B is housed inside a package, which is not shown here, to configure the laser diode module. As shown in FIGS. 12A and 12B, the laser diode module is provided with a base 1. A laser diode chip 3 is arranged and fixed to a device mounting platform 2 of the base 1 through a carrier 22. The laser diode chip 3 emits laser light in a waveband of 980 nm, for example.

The laser diode chip 3 is faced to the tip end side of a lensed fiber 8. The lensed fiber 8 is an optical fiber formed with a lens (a wedge-shaped lens in the example shown here) 5 on the tip end side thereof. The lens 5 of the lensed fiber 8 is extended forward from an end face 15 of a ferrule 4. The ferrule 4 is fixed to the base 1 through fixing parts 19. Furthermore, as the configuration of the fixing parts 19, alternative configurations are proposed variously other than the form shown in the drawings.

A carrier 40 is placed on the base 1 and a monitor photodiode 11 is fixed to the carrier 40. On the underside of the base 1, a Peltier module 20 for constantly maintaining temperatures of the laser diode chip 3 is disposed. The bottom of the Peltier module 20 is fixed to the top face of the bottom wall of the package, not shown.

In this type of the laser diode module, it is demanded that the laser diode chip 3 is highly accurately aligned with the lensed fiber 8 for optical coupling.

Traditionally, the alignment has been conducted as follows: for example, the lensed fiber 8 is moved in three axial directions, the optical axis direction of the laser light (Z-axis direction), the X-axis direction orthogonal to the Z-axis direction and almost parallel to the bottom surface of the laser diode chip 3 and the Y-axis direction orthogonal to both the X- and Z-axis directions; then, the lensed fiber 8 receives the laser light emitted from the laser diode chip 3 by the lens 5 on the tip end side of the lensed fiber 8 as the lensed fiber 8 is moved; an optical power meter measures light power emitted from the back end side of the lensed fiber 8; and a position where the light power becomes the maximum is determined as an alignment position.

However, the traditional optical axis alignment method needs to measure light power at many positions as the lensed fiber 8 is moved in the three axial directions, X, Y and Z. On this account, a lot of hours and efforts are required for alignment. Then, a method has been demanded that the alignment work of the laser diode chip 3 with an optical fiber such as the lensed fiber 8 can be conducted efficiently and the laser diode chip can be directly optically coupled to the optical fiber. However, such the method has not been established yet.

In one aspect, the invention is to provide an alignment method of a laser diode chip with an optical fiber capable of efficiently conducting the alignment work of the laser diode chip with the optical fiber and directly optically coupling the laser diode chip with the optical fiber and an alignment apparatus therefor.

Generally, when optical components are faced each other and light emitted from one of the optical components is incident into the other of the optical components, one of the optical components is moved in the optical axis direction (Z-axis direction) of light to approach the optical components each other. Then, the light power distribution of light incident into the other of the optical components from one of the optical components forms the light power distribution having a single peak where a certain focal length is the peak.

However, the circumstances are different in the case where the laser diode chip is faced to the coupling end face of the optical fiber and laser light emitted from the laser diode chip is directly incident into the optical fiber to optically couple the laser diode chip to the optical fiber. In the case of optically coupling the optical fiber, it is necessary to consider the reflection influence of light reflected from the coupling end face of the optical fiber. For example, even through an antireflection coating is applied to the coupling end face of the optical fiber, the reflection in the coupling end face of the optical fiber is not suppressed completely. When light is reflected from the coupling end face of the optical fiber, interference phenomena occur between the coupling end face of the optical fiber and the outgoing end face of the laser diode chip. The interference phenomena affect the optical coupling strength in the optical coupling of the laser diode chip to the optical fiber.

Then, this influence disturbs the light power distribution of the laser light. On this account, as shown in FIG. 9A, for example, the optical coupling strength of the laser diode chip to the optical fiber does not form the light power distribution having a single peak as described above.

Figure 9A:
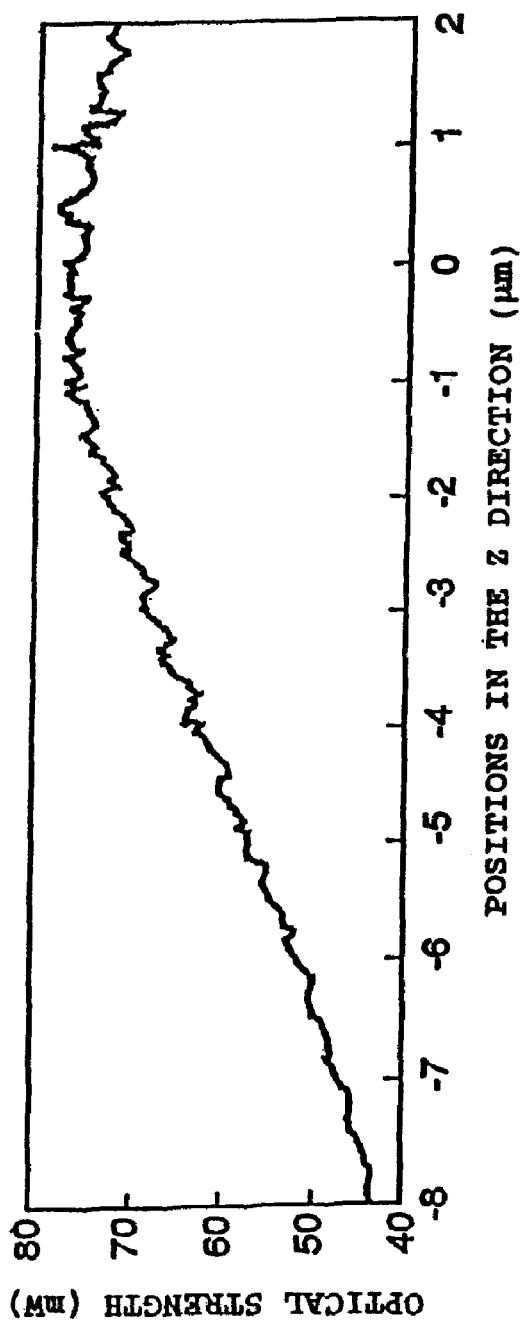
FIG. 9A depicts results of measuring intensities of laser light incident into the optical fiber from the laser diode chip, changing the positions of the optical fiber in the optical axis direction of the laser light.

FIG. 9A depicts results of measuring the light power of laser light directly incident into the optical fiber as the optical fiber is moved in the Z-axis direction on the basis of the reference position in the optical axis direction (Z-axis direction) of the laser light of the laser diode chip.

The lateral axis shown in FIG. 9A illustrates in which setting the reference position in the Z-axis direction as a reference (zero), it is set positive (+) when the optical fiber is moved close to the laser diode chip in the Z-axis direction, whereas it is set negative (−) when the optical fiber is moved away from the laser diode chip. Additionally, a wavelength of the laser light used in the measurement is a wavelength of 980 nm. The light power (intensity) of the laser light is measured at every time when the optical fiber is moved by 0.1 μm.

As shown in FIG. 9A, the light power distribution of optical coupling of the laser diode chip to the optical fiber repeats variations in the light power in which optical power (the light power of the laser light) is increased or decreased with the move of the optical fiber in the Z-axis direction. On this account, the light power distribution is disturbed. It is considered because the light oscillated from the laser diode chip returns from the tip end face of the optical fiber.

Accordingly, in determining the optimum position of the optical fiber in the Z-axis direction, when the optical fiber is not properly moved in the Z-axis direction or measured data is not appropriately selected, it is likely that the optimum position of the optical fiber might not be found because of the hindrance of the light power variations or the coupling end face side of the optical fiber might be damaged because the laser diode chip comes too close to the optical fiber.

In short, the meaning that the optimum position of the optical fiber is not found because of the hindrance of the light power variations is as follows. That is, when the light power distribution of optical coupling of the laser diode chip to the optical fiber is a single peak type, a received light power to be measured is monitored as the optical fiber is moved in the Z-axis direction and the position where the received light power forms the first peak can be found easily as the optimum position (optimum optical coupling position). However, as shown in FIG. 9A, when the light power variations occur, many peak positions are appeared such that the received light power is gradually increased to form a peak and then the received light power is decreased in turn, but it is increased again to reach the next peak. On this account, as similar to the single peak type, when the first peak position where the received light power turns from increase to decrease is set as the optimum position, a problem arises that the position far from the actual optimum position is wrongly set as the optimum position. In order to avoid such the problem, it is also considered that the received light power is minutely measured over the entire length in the Z-axis direction, but the method takes too much time to be practical.

Figure 9B:
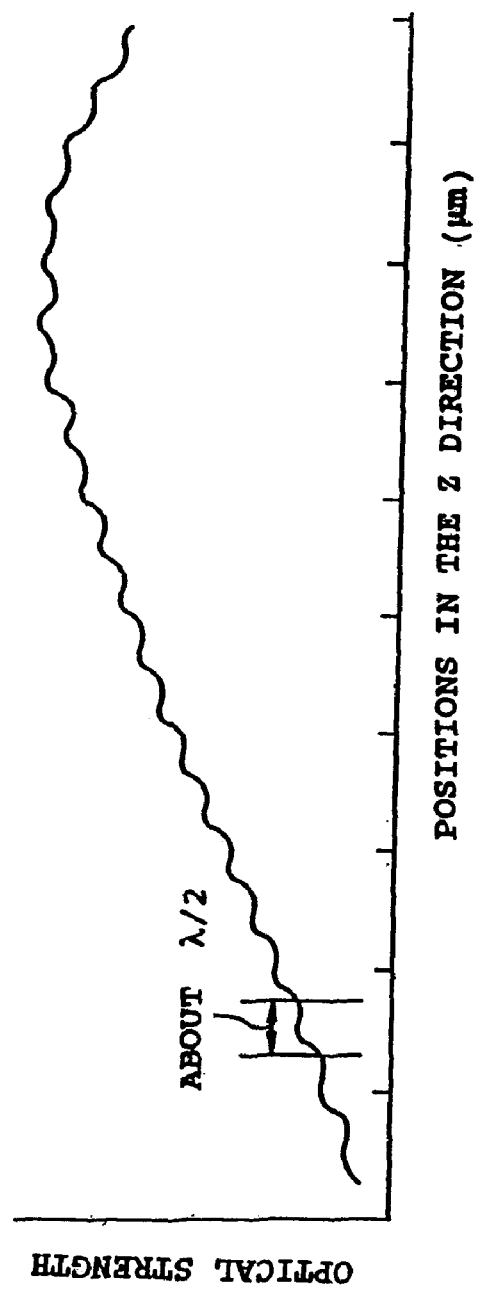
FIG. 9B depicts a schematic analysis diagram of the graph shown in FIG. 9A.

The inventor analyzed the light power variations to form a model as shown in FIG. 9B. Then, the inventor found that the light power distribution is varied at a cycle of a half of a wavelength of the laser light. This phenomenon in which the light power distribution is varied periodically has been first found by the inventor. In one aspect, the invention effectively utilizes the study result by the inventor in which the light power distribution is varied at a cycle of a half of a wavelength of the laser light.

Figure 1:
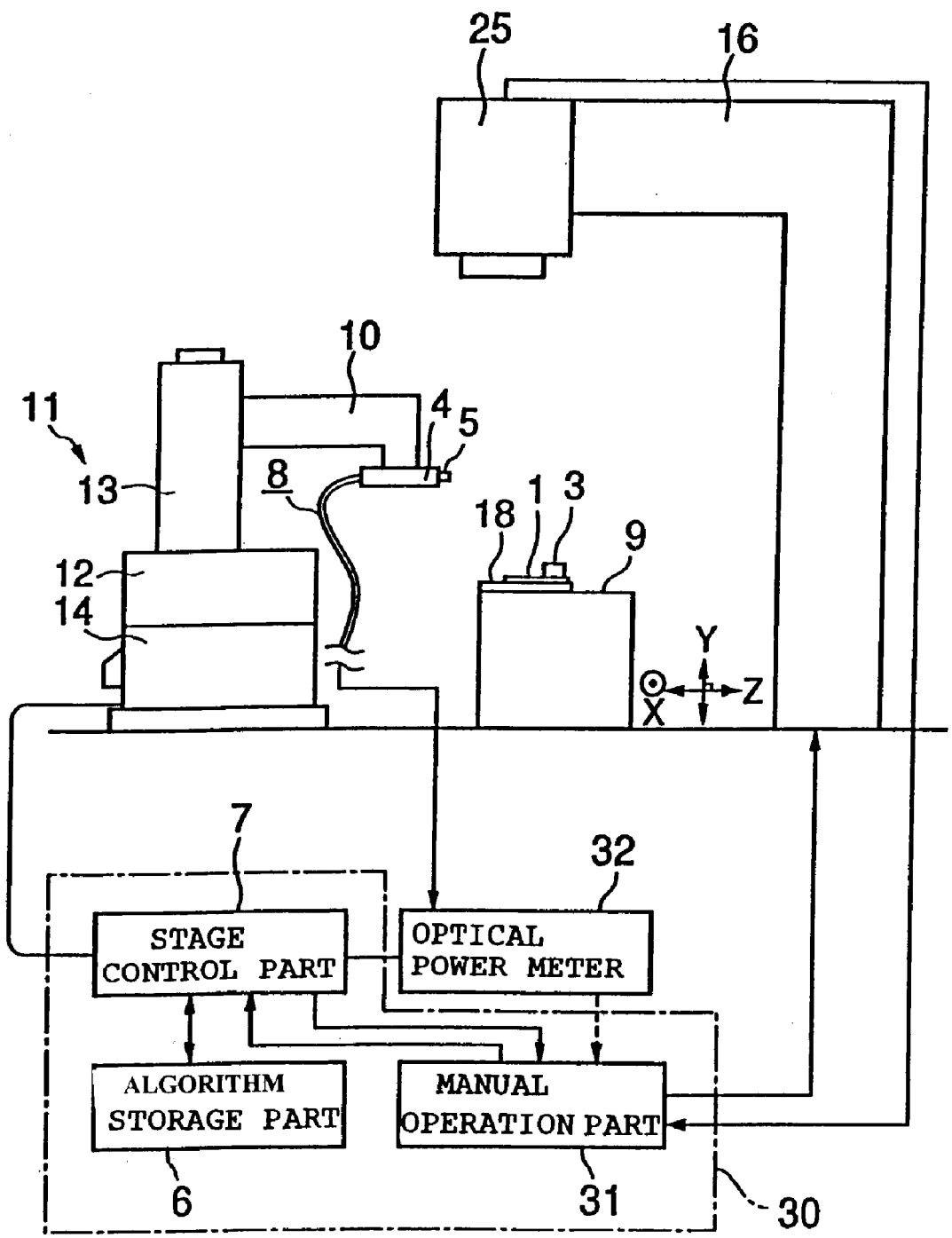
FIG. 1 depicts a configurational diagram illustrating one embodiment of an alignment apparatus employing the alignment method of the laser diode chip with the optical fiber in the invention.

FIG. 1 schematically depicts one embodiment of an alignment apparatus of the laser diode chip with the optical fiber in the invention in a state that a laser diode chip 3 and a lensed fiber 8 are placed.

As shown in FIG. 1, the alignment apparatus of the embodiment has a placement part 9 for the laser diode chip 3, an optical fiber moving stage 11 equipped with a ferrule gripping part (ferrule hand) 10, a camera 25, a camera moving unit 16, and a control unit 30. The control unit 30 has a stage control part 7, an algorithm storage part 6, and a manual operation part 31. The optical fiber moving stage 11 equipped with the ferrule gripping part (ferrule hand) 10 functions as a placement part for an optical fiber.

The placement part 9 is formed in which a package bottom plate 18 of a laser diode module is fixed and placed. On the package bottom plate 18, the laser diode chip 3 is fixed through a Peltier module (it is not shown in FIG. 1, see FIG. 12A) and a base 1.

The ferrule gripping part 10 is formed to grip a ferrule 4 inserted and fixed with the lensed fiber 8. The ferrule 4 is moved as it is gripped by the ferrule gripping part 10, whereby a lens 5 on the tip end side of the lensed fiber 8 inserted and fixed to the ferrule 4 is faced to a light emitting part of the laser diode chip 3 with a space. Additionally, an optical power meter 32 is connected to the back end side of the lensed fiber 8.

Figure 5A:
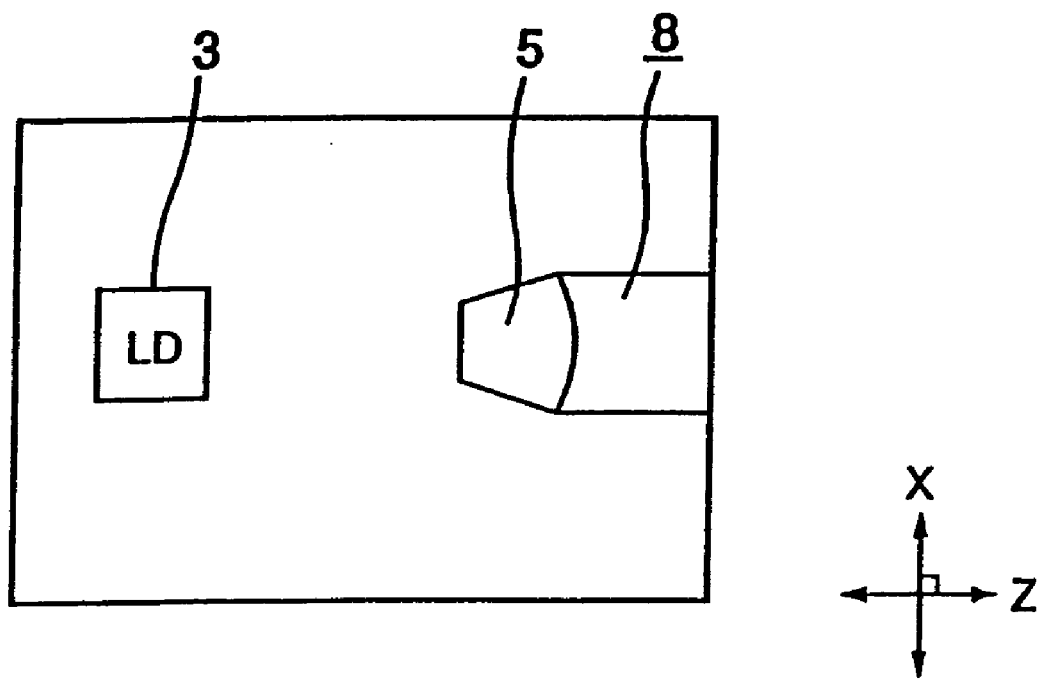
FIG. 5A depicts a diagram taken by a camera of the apparatus of the embodiment.

The camera 25 is disposed above the placement part 9. The camera 25 is mounted on the camera moving unit 16. An image taken by the camera 25 is added to the manual operation part 31 disposed inside the control unit 30. FIG. 5A depicts one example of the image taken by the camera 25. The control unit 30 is configured in which the manual operation part 31 operates the move and control of the camera moving unit 16.

The optical fiber moving stage 11 functions as a moving unit for moving the ferrule 4 gripped by the ferrule griping part 10. The optical fiber moving stage 11 is formed to allow the optical fiber faced to the laser diode chip 3 to be moved in directions of three orthogonal axes, the X-, Y- and Z-axes. The Z-axis direction is the optical axis direction of laser light emitted from the laser diode chip 3. In the apparatus shown in FIG. 1, a Z stage 14 performs the move in the Z-axis direction. An X stage 12 performs the move in the X-axis direction. A Y stage 13 performs the move in the Y-axis direction. Furthermore, the stage control part (control part) 7 disposed in the control unit 30 is configured to perform these moves.

The stage control part 7 has functions of moving and controlling the optical fiber moving stage 11 in accordance with the operation by the manual operation part 31 and of automatically controlling the move of the optical fiber moving stage 11 based on algorithms stored inside the algorithm storage part 6. Inside the algorithm storage part 6, the following algorithms for an alignment method of the laser diode chip with the optical fiber are stored.

Inside the algorithm storage part 6, an algorism for alignment in the Z-axis direction is stored as a first algorithm. This alignment method in the Z-axis direction determines the optimum position of the optical fiber in the Z-axis direction as follows.

First, as shown in FIGS. 12A and 12B, the laser diode chip 3 is faced to the coupling end face (the end face of the lens 5) of the lensed fiber 8. Then, the lensed fiber 8 takes in the laser light emitted from the laser diode chip 3 as it is moved in the optical axis direction (the Z-axis direction) of the laser light. At every time when the lensed fiber 8 is moved by a predetermined reference movement on the basis of the reference position in the Z-axis direction, the light power of the laser light incident into the lensed fiber 8 is measured and data of measured values of light power is acquired. Then, the position where the measured value of the light power becomes the maximum or a neighboring position thereof is determined as the optimum position of the optical fiber in the Z-axis direction.

The neighboring position is that centering the moved position of the reference movement where the measured value of light power becomes the maximum, for example, light power is measured as the optical fiber is inspected and moved at continuous or minute step intervals over the same section as the reference movement, for instance, and then an inspected and moved position where a light power greater than that measured at the moved position of the reference movement has been measured can be set as the neighboring position for determining the optimum position.

The reference movement is set to an amount of integral multiples of ($\lambda/2$), where a wavelength of the laser light is set $\lambda$; the reference movement is set: ($\lambda/2$)=(980/2) nm≅0.5 $\mu$m in this embodiment.

Accordingly, the optimum position of the optical fiber can be found in the Z-axis direction with no influence of the disturbed light power distribution in the Z-axis direction.

Inside the algorithm storage part 6, an algorithm for rough alignment in the X- and Z-axis directions is stored as a second algorithm. This alignment method determines a rough alignment position for the optical fiber on the XY plane as follows.

Figure 3A:
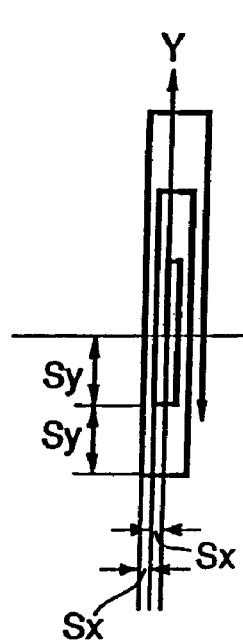
FIGS. 3A, 3B and 3C depict illustrations of an exemplary traveling trace of the optical fiber in the alignment (rough alignment) operation of the laser diode chip with the optical fiber on the XY plane, employing the apparatus of the embodiment.

First, as similar to that described above, the laser diode chip 3 is faced to the coupling end face of the lensed fiber 8. Then, as shown in FIG. 3A, starting at a predetermined reference position on the XY plane, the coupling end face side of the lensed fiber 8 is moved outside to form a rectangular whirl long in the Y-axis direction on the XY plane. More specifically, the coupling end face side of the lensed fiber 8 is moved relatively with respect to the laser diode chip 3 so that the trace drawn by the coupling end face of the lensed fiber 8 is formed into a rectangular whirl. Subsequently, the lensed fiber 8 takes in the laser light as it is moved.

At this time, the light power of the laser light incident into the lensed fiber 8 is measured. A position where the measured light power becomes the maximum is determined as a first rough alignment position in the whirl alignment of the laser diode chip with the optical fiber. After that, the whirl alignment is again performed, starting at the first rough alignment position. In this manner, the operation of the whirl alignment is performed one time or more, and the optimum position (final rough alignment position) of the optical fiber on the XY plane in the rough alignment is determined.

Figure 5B:
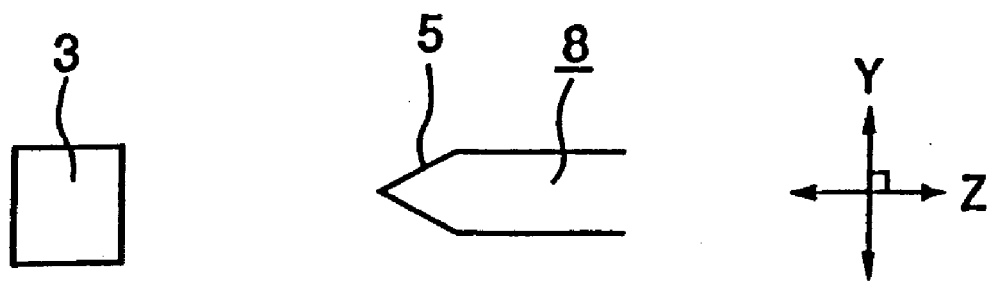
FIG. 5B depicts an enlarged side view of the diagram illustrating a state of the laser diode chip being faced to a lensed fiber.

As described above, the image taken by the camera 25 is to be an image shown in FIG. 5A, for example. This image is an image in the XZ plane. Therefore, it is difficult to adjust positions in the Y-axis direction by the operation of the manual operation part 31. In addition to this, in the lensed fiber 8 for use in optically coupling a laser diode chip of a wavelength of 980 nm having an elliptic light emitting pattern, for example, the form of the lens 5 formed on the tip end side thereof is a wedged shape as shown in FIG. 5B for obtaining a high coupling efficiency. In the case of the wedged lens form, when a misalignment in the Y-axis direction occurs, a degree of dropping the optical coupling efficiency to the laser diode chip 3 is greater as compared with a misalignment in the X-axis direction.

Additionally, as is well known, the laser light emitted from the laser diode chip 3 of a waveband of 980 nm forms an elliptic shape long in the X-axis direction at a position extremely close to the end face (laser light outgoing face) of the laser diode chip 3. However, the beam pattern of the laser light forms an elliptic shape long in the Y-axis direction radii when it separates a little from the end face of the laser diode chip 3.

Figure 3B:
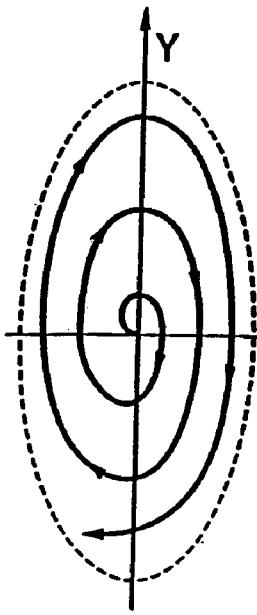
Figure 3C:
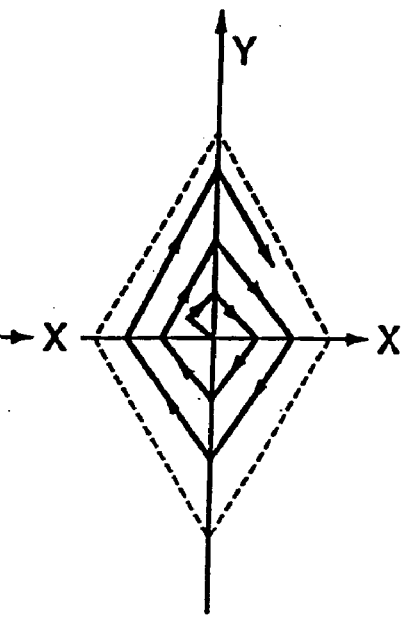

In consideration of such the phenomena, the coupling end face side of the lensed fiber 8 was moved in alignment so as to follow an approximately rectangular whirl-shaped trace long in the Y-axis direction on the XY plane in this embodiment. Accordingly, the rough alignment in the XY direction has been performed efficiently. As one example, a step width Sx in the X-axis direction shown in FIG. 3A is one-tenth of a step width Sy in the Y-axis direction. Furthermore, in FIG. 3A, a measured range of the light power incident into the lensed fiber 8 was formed to be approximately a rectangular shape, but the whirl shape may be a planform having a long axis in the Y-axis direction such as an approximately elliptic shape (FIG. 3B) and an approximately rhombic shape (FIG. 3C).

Moreover, in this embodiment, the rough alignment by the second algorithm first determines the optimum position (rough alignment position) of the optical fiber on the XY plane. Then, on the basis of the optimum position of the rough alignment, the laser diode chip and the optical fiber are microaligned on the XY plane to finally determine the optimum position of the optical fiber on the XY plane. This algorithm for the microalignment is stored inside the algorism storage part 6 as a third algorithm.

When the optimum position on the XY plane is determined by the third algorithm, first, the reference position on the XY plane in the rough alignment is to be the first reference position. Centering this reference position, the coupling end face of the lensed fiber 8 is moved to a plurality of set positions on the XY plane. Then, the light power of the laser light incident into the lensed fiber 8 at this time is measured at each of the positions. According to the measured results, the light power distribution on the XY plane is approximated to a quadric surface and an operation of detecting a maximum light power position is performed that a maximum light power position where the light power (received light power) becomes the maximum is determined.

Subsequently, the operation of detecting a maximum light power position is performed one time or more such that the operation of detecting a maximum light power position according to the quadric surface approximation is again performed on the basis of the maximum light power position. Then, the maximum light power position finally determined is defined as the optimum position of the optical fiber on the XY plane according to the microalignment.

Figure 4:
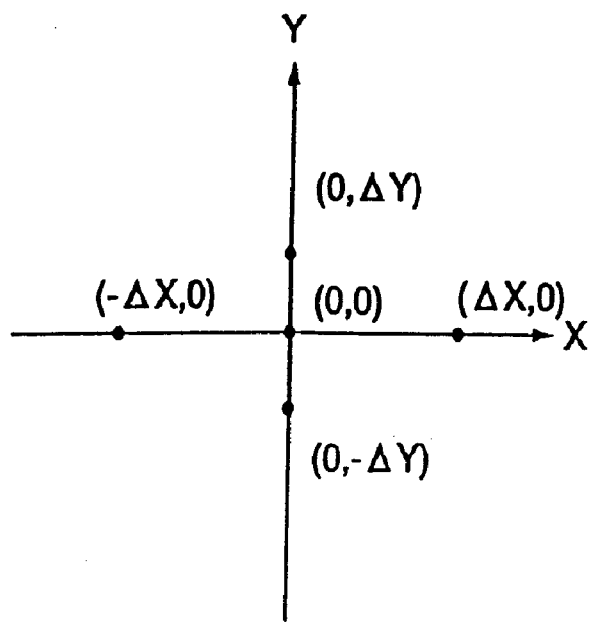
FIG. 4 depicts an illustration on the microalignment operation of the laser diode chip with the optical fiber on the XY plane, employing the apparatus of the embodiment.

There are various methods of the quadric surface approximation, but five set points in total are defined in this embodiment as shown in FIG. 4; one point at a predetermined reference position, two points sandwiching this reference position in the X-axis direction and two points sandwiching this reference position in the Y-axis direction. The coupling end face side of the lensed fiber 8 is moved to these set points and the operation of detecting a maximum light power position according to the quadric surface approximation is performed by applying the five-point alignment method.

The stage control part 7 performs an alignment operation in which the first to third algorithms are properly combined according to the specification of the first to third algorithms (specifications of assigning which algorithms to be used and of an operation order for each of the assigned algorithms). Accordingly, the optimum position of the optical fiber (the coupling end face of the optical fiber) in the X-, Y- and Z-axis directions is determined. The lensed fiber 8 is moved to the determined microalignment position to optically couple the lensed fiber 8 to the laser diode chip 3.

Next, the alignment method of the laser diode chip with the optical fiber (the lensed fiber 8 here) employing the alignment apparatus will be described.

First, as shown in FIG. 1, the laser diode chip 3 is fixed to the base 1 on the placement part 9. The ferrule 4 inserted and fixed with the lensed fiber 8 is gripped by the ferrule gripping part 10. At this time, the position of the laser diode chip 3 is preferably adjusted so as to match the optical axis of the laser light emitted from the laser diode chip 3 with the Z-axis on which the lensed fiber 8 is moved. In this state, the operation of the manual operation part 31 allows the stage control part 7 to perform control operations, whereby the move of the optical fiber moving stage 11 is controlled. Then, the laser diode chip 3 is faced to the coupling end face of the lensed fiber 8 to start alignment (step 101 shown in FIG. 6).

In step 101, the ferrule 4 gripped by the ferrule griping part 10 is moved to bring the end face of the ferrule 4 close to the vicinity of the end face of the laser diode chip 3. This operation is performed by operating the manual operation part 31 based on an image taken by the camera 25, for example.

Figure 6:
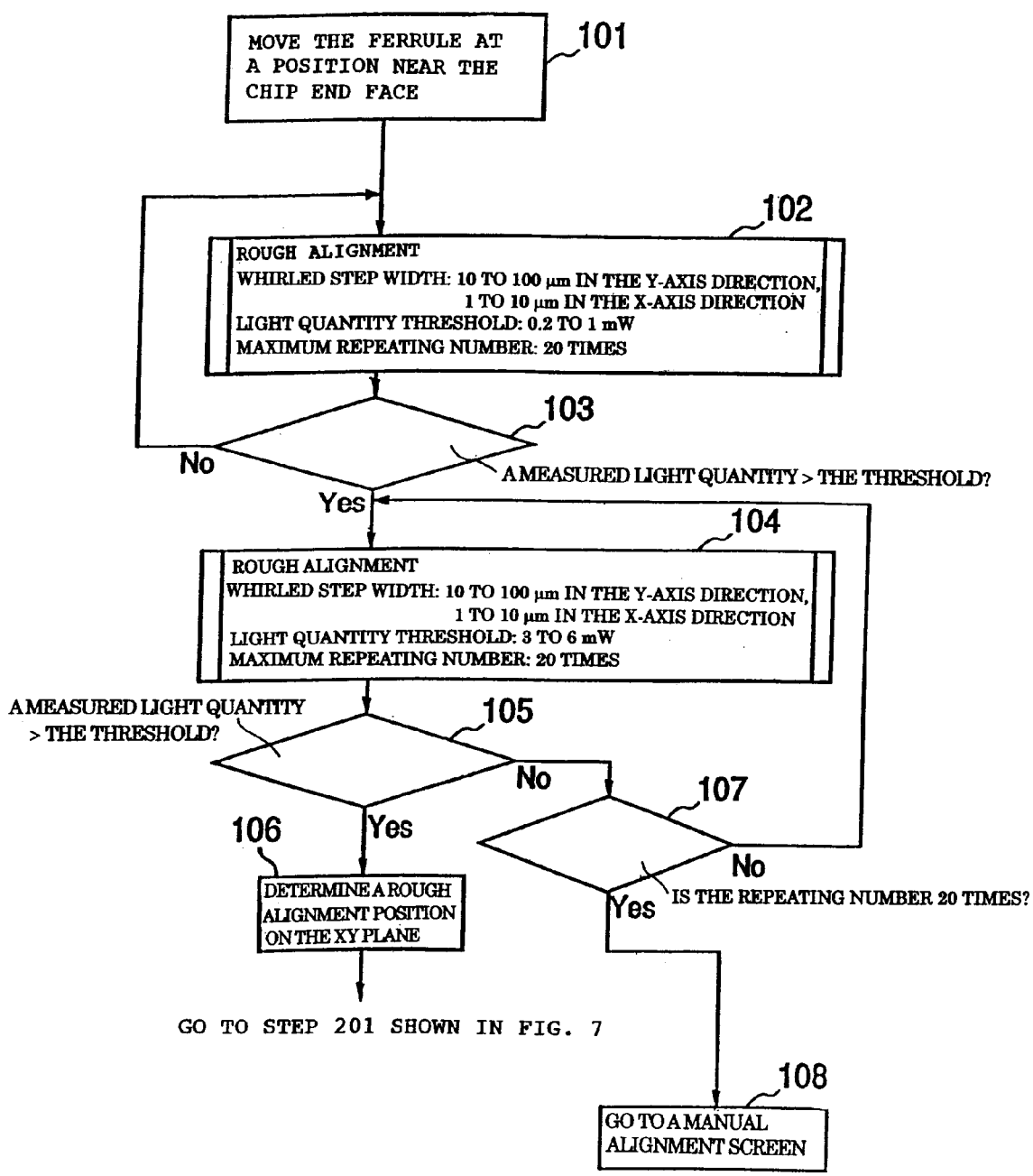
FIG. 6 depicts a flow chart illustrating one example of the alignment (rough alignment) operation of the laser diode chip with the optical fiber on the XY plane, employing the apparatus of the embodiment.

Then, in step 102 shown in FIG. 6, rough alignment on the XY plane is started. This rough alignment is performed by the second algorism.

More specifically, starting at a predetermined reference position on the XY plane, the coupling end face side of the lensed fiber 8 is moved outside in a whirl shape long in the Y-axis direction on the XY plane, as shown in FIG. 3A. Then, the coupling end face (the end face of the lens 5) of the lensed fiber 8 receives the laser light emitted from the laser diode chip 3 as it is moved. Subsequently, the position where the detected value of the received light power becomes the maximum, the value is detected by the optical power meter 32 connected to the lensed fiber 8, is defined as the rough alignment position in the whirl alignment of the laser diode chip 3 to the lensed fiber 8 on the XY plane. After that, the whirl alignment is repeated one time or more up to 20 times such that the rough alignment position on the XY plane is used as a starting point to again perform the whirl alignment, if necessary.

Additionally, in the embodiment, in order to reduce the number of steps of rough alignment, the interval between measurement points in the long axis direction was set greater than that in the short axis direction, where the step width (an interval between measurement points) Sx in the X-axis direction, a short axis in the whirl alignment, is set to a set value within the range of 1 to 10 $\mu$m and the step width Sy in the Y-axis direction as a long axis is set to a set value within the range of 10 to 100 $\mu$m. Then, in step 103, the value of the detected light power at the rough alignment position reaches equal to or above a set value within the range of 0.1 to 1 mW that has been determined as a threshold of the light power and then proceed to step 104.

In step 104, only the threshold of the light power in the whirl alignment is changed to a set value within the range of 3 to 6 mW and the whirl alignment is performed as similar to that described above. Subsequently, when in step 105 the value of the detected light power at the rough alignment position on the XY plane reaches equal to or above the set value within the range of 3 to 6 mW that has been determined as a threshold of the light power, this position is determined as the final optimum position of the optical fiber on the XY plane in the rough alignment in step 106. After that, proceed to step 201 shown in FIG. 7.

Furthermore, when the value of the detected light power at the rough alignment position does not reach the set value (threshold) within the range of 3 to 6 mW in step 105, the operation of the whirl alignment in step 104 is repeated until the maximum number of repeating reaches up to 20 times in step 107. When the maximum number of repeating reaches to 20 times in step 107, transfer to a manual alignment screen in step 108. Then, the laser diode chip 3 is again faced to the lensed fiber 8, return to the operation in step 101.

Figure 7:
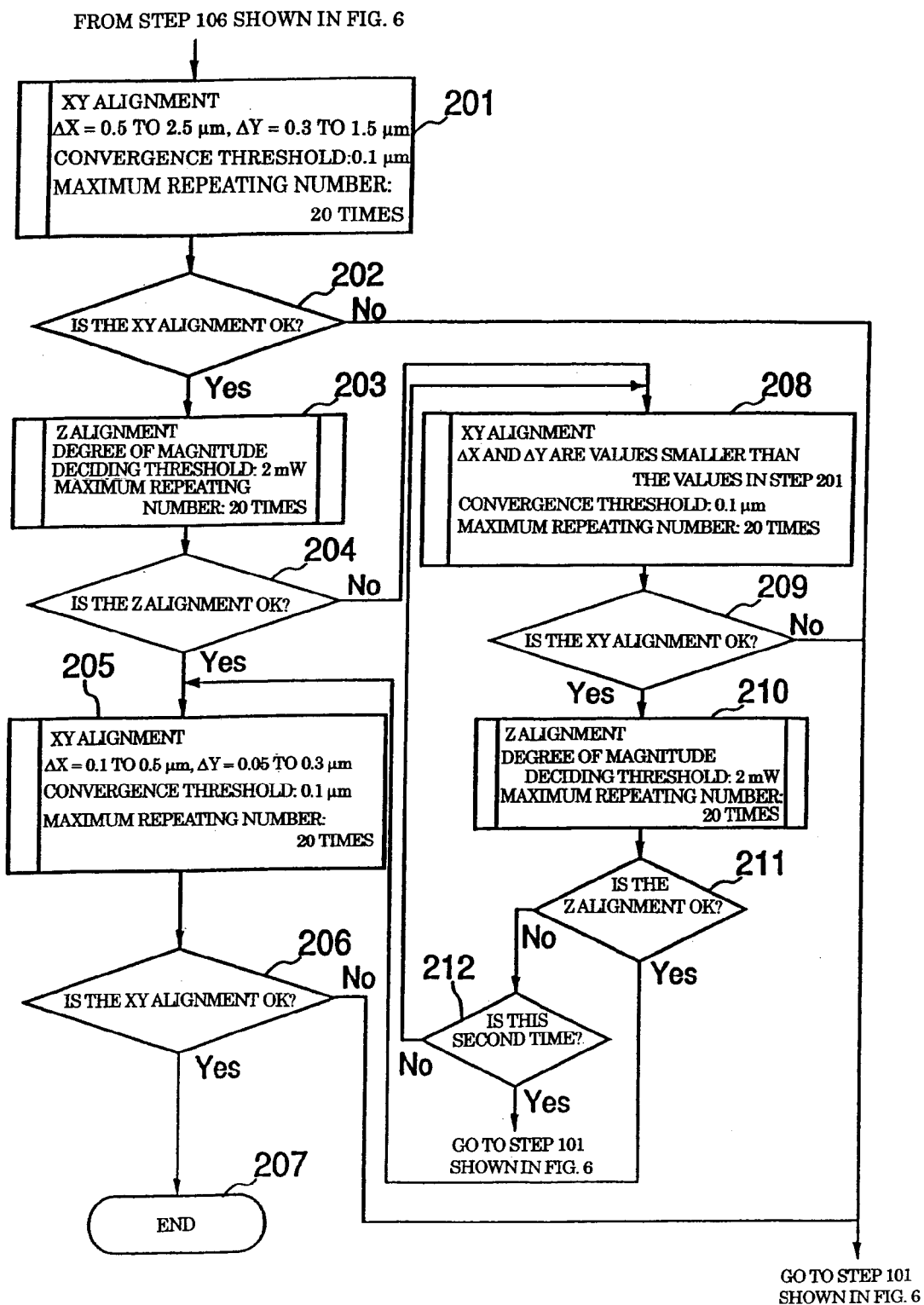
FIG. 7 depicts a flow chart illustrating the alignment operation of the laser diode chip with the optical fiber following FIG. 6.

In step 201 shown in FIG. 7, microalignment is performed to determine the optimum position of the optical fiber on the XY plane. This alignment is performed based on a flow chart shown in FIG. 8. That is, the final rough alignment position ($X_0$, $Y_0$, for example) defined by the whirl alignment is set as a reference position (0, 0) on the XY plane in step 301.

Subsequently, in step 302, on the basis of the reference position, the coupling end face side of the lensed fiber 8 is moved to a plurality of positions ($\Delta X$, 0), ($-\Delta X$, 0), (0, $\Delta Y$) and (0, $-\Delta Y$), as shown in FIG. 4, and the light power is measured at each of the moved position.

Additionally, after that, the coupling end face of the lensed fiber 8 is moved to the reference position (0, 0) and the light power at this reference position is again measured and averaged to the measured value of the light power in the rough alignment, if necessary. Here, the values of $\Delta X$ and $\Delta Y$ (intervals between the measured points) are set $\Delta X > \Delta Y$. Furthermore, as shown in step 201 in FIG. 7, $\Delta X$ is set to a set value defined within the range of 0.5 to 2.5 $\mu$m and $\Delta Y$ is set to a set value defined within the range of 0.3 to 1.5 $\mu$m, for example. In this manner, in the microalignment, an interval between the measured points in the Y-axis direction where highly precise alignment accuracy is demanded is preferably more narrowed than that in the X-axis direction to enhance alignment accuracy.

Figure 8:
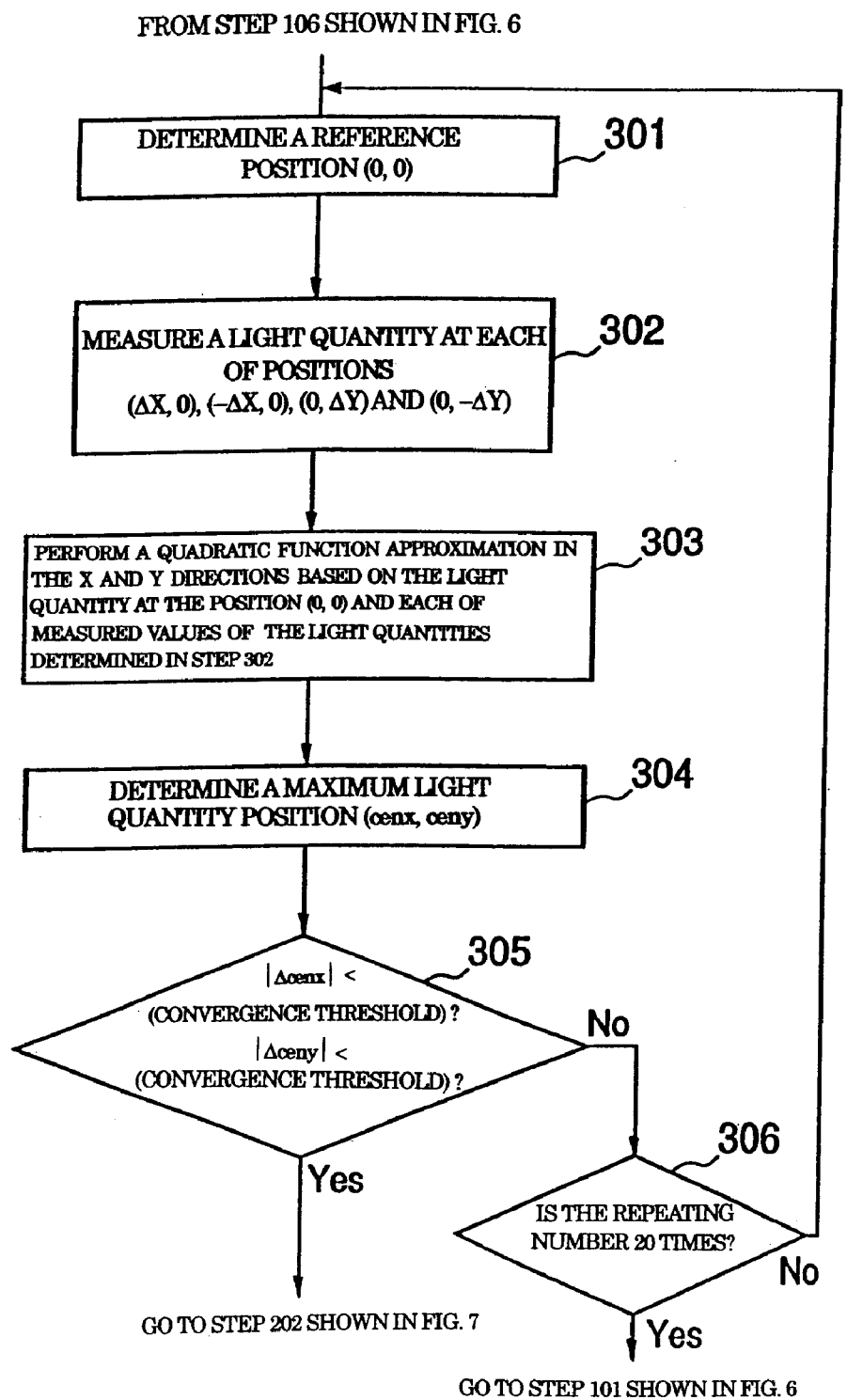
FIG. 8 depicts a flow chart illustrating one example of the microalignment operation of the laser diode chip with the optical fiber on the XY plane, employing the apparatus of the embodiment.

Then, in step 303 shown in FIG. 8, the light power distribution in the X-axis direction is approximated to a quadratic function according to values of light power measured at the positions ($\Delta X$, 0) and ($-\Delta X$, 0) of the coupling end face of the lensed fiber 8. Meanwhile, the light power distribution in the Y-axis direction is approximated to a quadratic function according to values of light power measured at the positions ($\Delta Y$, 0) and ($-\Delta Y$, 0). Then, in step 304, a maximum light power position (cenx, ceny) where the light power becomes the maximum is determined according to a quadratic function approximation of the light power distribution in the X- and Y-directions. After that, return to step 301 to repeat the processes, and then finite differences between cenx and cenx and between ceny and ceny in measured results of two continuous maximum light power positions are determined as $\Delta$cenx and $\Delta$ceny, respectively.

Moreover, in order to prevent the X stage 12 and the Y stage 13 from moving greatly, when the quadratic function is not projecting upward or in the case of $|\Delta\text{cenx}| > \Delta X$, $|\Delta\text{ceny}| > \Delta Y$, a coordinate having a greater light power at each of the positions ($\Delta X$, 0) and ($-\Delta X$, 0) is set cenx, or a coordinate having a greater light power at each of the positions ($\Delta Y$, 0) and ($-\Delta Y$, 0) is set ceny.

Then, in step 305, it is determined whether $|\Delta\text{cenx}| < $(a convergence threshold) and $|\Delta\text{ceny}| < $(a convergence threshold), or not. When it is $|\Delta\text{cenx}| < $(a convergence threshold) and $|\Delta\text{ceny}| < $(a convergence threshold), computing is finished and the maximum light power position (cenx, ceny) is determined as the optimum position (microalignment position) of the lensed fiber 8 on the XY plane. In this case, it can be determined that the XY alignment has been done properly (it is OK) in step 202 shown in FIG. 7, and thus proceed to step 203.

Besides, when $|\Delta\text{cenx}| < $(a convergence threshold) and $|\Delta\text{ceny}| < $(a convergence threshold) are not made in step 305 shown in FIG. 8, the alignment operation returns to step 301 through step 306 shown in FIG. 8. Subsequently, the maximum light power position (cenx, ceny) is used as the reference (0, 0) to perform the operation of detecting a maximum light power position as similar to that described above. The operation of detecting a maximum light power position is repeated up to 20 times until $|\Delta\text{cenx}| < $(a convergence threshold) and $|\Delta\text{ceny}| < $(a convergence threshold) are made. Then, the maximum light power position finally determined is defined as the optimum position (microalignment position) of the optical fiber on the XY plane.

As this five-point alignment, it is preferable that the light power of the laser light incident into the lensed fiber 8 is measured only on the long and short axes of the elliptic beam pattern of the laser light and the quadratic surface approximation of the light power is performed in point of reduced measured points and efficient stage movement.

Next, in step 203 shown in FIG. 7, the alignment in the Z-axis direction is performed based on the first algorithm. More specifically, the lensed fiber 8 receives the laser light emitted from the laser diode chip 3 as the lensed fiber 8 is moved in the Z-axis direction almost parallel to the optical axis direction of the laser light. The light power of the laser light incident into the lensed fiber 8 is measured at every time when the lensed fiber 8 is moved (step moved) by 0.5 $\mu$m on the basis of the reference position in the Z-axis direction.

Here, the direction of the move in the Z-axis direction where the lensed fiber 8 comes close to the laser diode chip 3 is set positive (+) and the direction of the move in the Z-axis direction where the lensed fiber 8 separates from the laser diode chip 3 is set negative (−).

Additionally, the position where the light power in the Z-axis direction becomes the maximum is a position about 4 $\mu$m from the end face of the laser diode chip 3, for example; it is a position extremely close to the laser diode chip 3. On this account, when the lensed fiber 8 is moved by every 0.5 $\mu$m, the lensed fiber 8 might collide against the laser diode chip 3. In order to avoid this, the move in the Z-axis direction is decided in this embodiment as follows.

More specifically, an optical power Pa at a current position is compared with an optical power Pb at a position apart from the laser diode chip only by +0.5 $\mu$m. Then, when it is Pa−Pb<(a degree of magnitude deciding threshold), the direction of moving the lensed fiber 8 is set to a positive direction (the direction approaching the laser diode chip 3). When it is Pa−Pb$\geq$(a degree of magnitude deciding threshold) the direction of moving the lensed fiber 8 is set to a negative direction (the direction separating from the laser diode chip 3). The lensed fiber 8 is moved in the decided direction by every 0.5 $\mu$m in the Z-axis direction. Additionally, in the embodiment, the degree of magnitude deciding threshold is set 2 mW.

Then, as indicated by arrows shown in FIG. 2A, for example, when the direction of moving the lensed fiber 8 is set to the positive direction (the direction approaching the laser diode chip 3) and is moved in the Z-axis direction, a position (a position a shown in FIG. 2A) is found that a measured value of the light power (optical power) of the laser light incident into the lensed fiber 8 begins to reduce. The lensed fiber 8 is moved by one more pitch from this position (moved to a position b shown in FIG. 2B) to confirm whether the light power is surely reduced.

Subsequently, when the reduced light power is confirmed, the direction of moving the lensed fiber 8 is set to the negative direction (the direction separating from the laser diode chip 3) and the lensed fiber 8 is moved in the Z-axis direction, as indicated by arrows shown in FIG. 2B. Also in moving the lensed fiber 8 in the negative direction, a position (a position c shown in FIG. 2B) is found that a measured value of the light power (optical power) of the laser light incident into the lensed fiber 8 begins to reduce, as similar to that described above.

The lensed fiber 8 is moved by one more pitch from this position (moved to a position d shown in FIG. 2B) and it is confirmed whether the light power is surely reduced. Then, when the reduced light power is confirmed, the direction of moving the lensed fiber 8 is changed and the lensed fiber 8 is moved to a mid-point e between the positions b and d.

After that, as this position e is used as a reference point, the light power of the laser light incident into the lensed fiber 8 is measured at every time when the lensed fiber 8 is moved by a value (about 0.1 µm, for example) smaller than the reference movement (0.5 µm). According to this measured result, a position where the light power becomes the maximum is defined as the optimum position (alignment position) of the optical fiber in the Z-axis direction.

As described above, according to the alignment in the Z-axis direction, it is determined that the Z alignment has been performed properly (it has been OK) in step 204 shown in FIG. 7. When the optimum position of the optical fiber in the Z-axis direction is determined, the microalignment in the XY direction is again performed in step 205 shown in FIG. 7. In addition, this microalignment method is performed almost the same as that in step 201; only the values of ΔX and ΔY are changed. For example, ΔX is set to a set value defined within the range of 0.1 to 0.5 µm, and ΔY is set to a set value defined within the range of 0.05 to 0.3 µm.

Then, after finishing microalignment in step 205, when it is determined that the XY alignment in step 205 has been performed properly in step 206, the maximum light power position finally determined is defined as the optimum position (microalignment position) of the optical fiber on the XY plane and then the alignment is completed in step 207. Furthermore, after this, the lensed fiber 8 will be fixed to the base 1 such as fixing the ferrule 4 to the fixing parts 19.

On the other hand, in the alignment in the Z-axis direction in step 203, when the number of repeating the move in the Z-axis direction reaches 20 times (the maximum number of repeating) but the optimum position of the optical fiber in the Z-axis direction cannot be determined, it is determined in step 204 that the alignment in the Z-axis direction is not OK. Then, in step 208, the microalignment in the XY direction is performed as similar to that in step 205. At this time, ΔX and ΔY are set to values smaller than the case of step 201.

Subsequently, when it is determined in step 209 that the XY alignment has been performed properly, the alignment in the Z-axis direction is performed in step 210, as similar to that in step 203. When it is determined in step 211 that the Z alignment has been performed properly, the microalignment in the XY direction is performed in step 205 and the alignment is completed.

Additionally, in the microalignment in the XY direction in steps 201, 205 and 208, when the alignment has not been performed properly even though it reaches the maximum number of repeating, it is determined in each of steps 202, 206 and 209 that the XY alignment has not been performed properly. In this case, return to step 101 shown in FIG. 6, and the alignment operation is again performed from the rough alignment on the XY plane.

Furthermore, in the alignment in the Z-axis direction in step 210, when the alignment has not been performed properly even though it reaches the maximum number of repeating, temporarily return to step 208 through step 212. The operations in steps 208 to 210 are again performed.

Moreover, when it is determined in step 211 that the Z alignment has not been performed properly even though the operation is again performed in step 210 (even though the operation in step 210 has been performed twice), the alignment operation is returned to step 101 shown in FIG. 6 through step 212. Then, the alignment operation is again performed, starting the rough alignment on the XY plane.

According to the embodiment, the operation described above allows the laser diode chip 3 to be aligned with the optical fiber 8 in the X, Y and Z directions. In this alignment operation, when the rough alignment on the XY plane is preformed, for example, the alignment is performed as the lensed fiber 8 is moved to follow the whirl-shaped trace long in the Y-axis direction. Thus, the rough alignment position on the XY plane can efficiently be determined at a fewer number of moving.

That is, as described above, the image taken by the camera 25 is the image shown in FIG. 5A. It is difficult to perform alignment in the Y-axis direction by the manual operation as the plane image is observed. In this point, this embodiment described above determines the rough alignment position on the XY plane as the lensed fiber 8 is moved in the whirl shape long in the Y-axis direction. On this account, the method of this embodiment is an excellent alignment method capable of backing up that the alignment accuracy in the Y-axis direction by the manual operation is lower than that in the X-axis direction.

Additionally, as described above, a spot shape of the laser light emitted from the laser diode chip 3 forms into an ellipse long in the Y-axis direction except at the position extremely close to the end face of the laser diode chip 3 in the Z-axis direction. Also in consideration of this point, the lensed fiber 8 is aligned as the coupling end face of the lensed fiber 8 is moved in the whirl shape long in the Y-axis direction and thereby the spot position of the laser light can be picked up promptly. Then, the rough alignment position on the XY plane can be determined efficiently at a fewer number of moving.

Furthermore, according to the embodiment, the microalignment on the XY plane is performed by the five-point alignment method. Therefore, the optimum position of the lensed fiber 8 on the XY plane can be determined efficiently and accurately to align the laser diode chip 3 with the lensed fiber 8.

Moreover, according to the embodiment, in aligning the laser diode chip 3 with the lensed fiber 8, the light power distribution in the Z-axis direction is varied at a cycle λ/2 (about 0.5 µm in this embodiment), a half of the wavelength of the laser light. Thereby, the light power of the laser light incident into the lensed fiber 8 is measured at every time when the lensed fiber 8 is moved by 0.5 µm in the Z-axis direction in this embodiment. Then, a step moved position where the measured value of the light power becomes the maximum or a neighboring position thereof where the received light power is much greater is defined as the optimum position of the optical fiber in the Z-axis direction. Accordingly, the optimum position of the optical fiber in the Z-axis direction can be defined efficiently and accurately to allow the laser diode chip 3 to be aligned with the lensed fiber 8.

Besides, the invention is not limited to the embodiment, which can adopt various forms. For example, the wavelength of the laser light emitted from the laser diode chip 3 was set 980 nm, but the wavelength of the laser light may be other wavelengths; it may be 1480 nm, for example.

In addition, the form of the tip end side of the lensed fiber is not limited to the wedged shape, which may be a round point form of axial symmetry.

Furthermore, in the embodiment, the reference movement of the lensed fiber 8 in the alignment in the Z-axis direction was set to a value about a half of the wavelength corresponding to the wavelength of the laser light. However, the reference movement of the lensed fiber 8 in the alignment in the Z-axis direction may be integer multiples of about a half of the wavelength.

However, when the optical axis of the laser light does not match with the Z-axis, the light power distribution in the Z-axis direction is varied at a cycle: (a half of the wavelength of the laser light)×α(α is a correction coefficient). Thus, the reference movement is preferably multiplied by α as well.

Moreover, in the embodiment, in setting the optimum position of the optical fiber in the Z-axis direction, the light power of the laser light incident into the lensed fiber 8 was measured every time when the lensed fiber 8 was moved by 0.5 μm, and the position where the measured value becomes the maximum or the neighboring position thereof was defined as the optimum position of the optical fiber in the Z-axis direction. As an alternative thereof, the optimum position of the optical fiber in the Z-axis direction may be determined by the following method.

More specifically, as similar to the embodiment described above, the laser diode chip 3 is first faced to the coupling end face of the lensed fiber 8. Then, the lensed fiber 8 takes in the laser light as the lensed fiber 8 is moved in the Z-axis direction almost matching with the optical axis of the laser diode chip 3. Then, the light power of the laser light incident into the lensed fiber 8 is continuously measured. Subsequently, relative data between the light power of the laser light and the movement of the lensed fiber 8 in the Z-axis direction is classified at every predetermined reference movement and is taken sequentially. And after moving the lensed fiber 8 is finished, a central value of the light power is determined within each of the classified ranges according to a central value deciding method defined beforehand.

After that, the alignment method can be adopted in which the optimum position of the optical fiber in the Z-axis direction is determined within the classified range where the central value of the light power becomes the maximum.

At this time, the reference movement is set to an amount of integer multiples of $(\lambda)/2$, where the wavelength of the laser light is set $\lambda$, for example. For the central value of the light power, various central value deciding methods can be adopted such as a light power mean value within the classified range, a maximum value of the light power within the classified range, and a measured value at the same phase position within the classified range.

The followings are specific examples of this method. First, specific example 1 will be described. For example, the optimum position of the optical fiber on the XY plane is determined according to the proper method as described above, for example. On the basis of the reference position in the optical axis (Z) direction, the lensed fiber 8 is moved in the direction approaching the laser diode chip 3 side at a constant rate. Additionally, when the lensed fiber 8 comes close to the laser diode chip 3 side here, the sign of the movement is set positive (+) and a wavelength of the laser light is set to a wavelength at a 980 nm band.

A range (the classified range) of the reference position (0) to +0.5 μm is set as a first classified range and a maximum value of the light power (optical power) of the laser light is determined within this range. The value is set P1, for example. Subsequently, a range of +0.5 to +1.0 μm is set as a second classified range and a maximum value of the light power of the laser light is determined within this range. The value is set P2, for example. Then, a degree of magnitude deciding threshold is set β. When P1+β<P2, a maximum light power of the laser light in the range of the reference position to +1.0 μm (both the first and second classified ranges) is set to the value of P2.

Subsequently, the second range is defined as a new first range. Then, P2 is substituted into P1 (the value of P1 is updated to the value of P2). And a range of +1.0 to 1.5 μm is set as a new second range and a maximum light power of the laser light is determined within the new second range. The determined value is set as a new value of P2 (the value of P2 is updated). After that, the new P1 and P2 are determined whether it is P1+β<P2.

In this manner, the first and second ranges are sequentially updated, the values of P1 and P2 are sequentially updated according to this and it is determined whether it is P1+β<P2. Then, an optimum position of the optical fiber in the Z-axis direction is further sought in the first range when it is P1+β≧P2. The seek at this time is done according to a well-known hill-climbing method. This hill-climbing method is that the received light power is measured at a continuous or minute interval throughout the section in the given range to determine a position of the maximum received light power therein. The lensed fiber 8 is positioned at such the optimum position (alignment position) of the optical fiber in the Z-axis direction to couple the laser diode chip 3 to the lensed fiber 8.

Next, specific example 2 will be described. First, the lensed fiber 8 is separated from the position neighboring the laser diode chip 3 (it is set as a reference position here) in the Z-axis direction and the optical power of the laser light incident into the lensed fiber 8 from the laser diode chip 3 is measured. This optical power is sequentially taken as it is classified to every predetermined reference movement. Then, after moving the lensed fiber 8 is finished, a central value of the light power is determined within the classified range according to a central value deciding method set beforehand (a mean value of the light power is taken, for example), based on relative data between the movement from the reference position and the light power.

After that, in the range where the central value of the light power becomes the maximum, the optimum position (alignment position) of the optical fiber in the Z-axis direction is determined according to a predetermined method for setting the optimum position such as the hill-climbing method. Then, the laser diode chip 3 is optically coupled to the lensed fiber 8 at that position.

The optimum position of the optical fiber in the Z-axis direction is set as described above, whereby the optimum position of the optical fiber in the Z-axis direction can be defined efficiently and accurately, as similar to the embodiment described above. Then, at that optimum position, the laser diode chip 3 is aligned with the lensed fiber 8.

Additionally, the example in which the laser diode chip 3 is aligned with the lensed fiber 8 has been described in the embodiment. However, the invention can be adapted to an alignment method or alignment apparatus for optically coupling an optical fiber other than the lensed fiber 8 to the laser diode chip 3.

Furthermore, in the embodiment, the five-point alignment method was adopted as the microalignment method for determining the optimum position of the optical fiber on the XY plane. However, the optimum position of the optical fiber on the XY plane may be determined according to methods other than the five-point alignment method.

More specifically, in the five-point alignment method, the light power was measured at five positions to determine the maximum light power position (cenx, ceny): the reference position (0, 0), two positions in the X-direction (ΔX, 0) and (−ΔX, 0), and two positions in the Y-direction (ΔY, 0) and (−ΔY, 0). On the other hand, alternatively the positions for measuring the light power may be increased more than five points, the quadratic surface approximation may be made as similar to the embodiment and the optimum position of the optical fiber on the XY plane may be determined.

Moreover, as a method for determining the optimum position of the optical fiber on the XY plane in the microalignment, the following method can be adapted, for example. First, measured values of the light power are determined when the lensed fiber 8 is moved to a plurality of points, five points or above. Then, based on these measured values of the light power, the maximum light power position (cenx, ceny) is determined from a quadratic function approximation in the X-axis direction and a quadratic function approximation in the Y-axis direction, as almost similar to the embodiment. On the other hand, the light power distribution on the XY plane is approximated by a polynomial approximate expression including coordinates x and y on the XY plane. Simultaneous equations are solved that have been obtained in which each of the measured values of the light power at the plurality of points on the XY plane is substituted into the polynomial approximate expression, whereby unknown coefficients in each term of the polynomial approximate expression are determined.

Then, when a difference between the measured value of the light power at the maximum light power position (cenx, ceny) and a value of substituting cenx and ceny into x and y of the polynomial approximate expression reaches the allowable range, the maximum light power position (cenx, ceny) is defined. This defined position may be determined as the optimum position (alignment position) of the optical fiber on the XY plane.

Alternatively, the optimum position of the optical fiber in the microalignment on the XY plane may be determined according to the following simplex method as well. This simplex method is that a procedure is repeated in which a new set point having a much greater light power is set instead of the minimum light power point among a plurality of points on the XY plane, whereby the maximum light power position is promptly, accurately determined on the XY plane.

Figure 10:
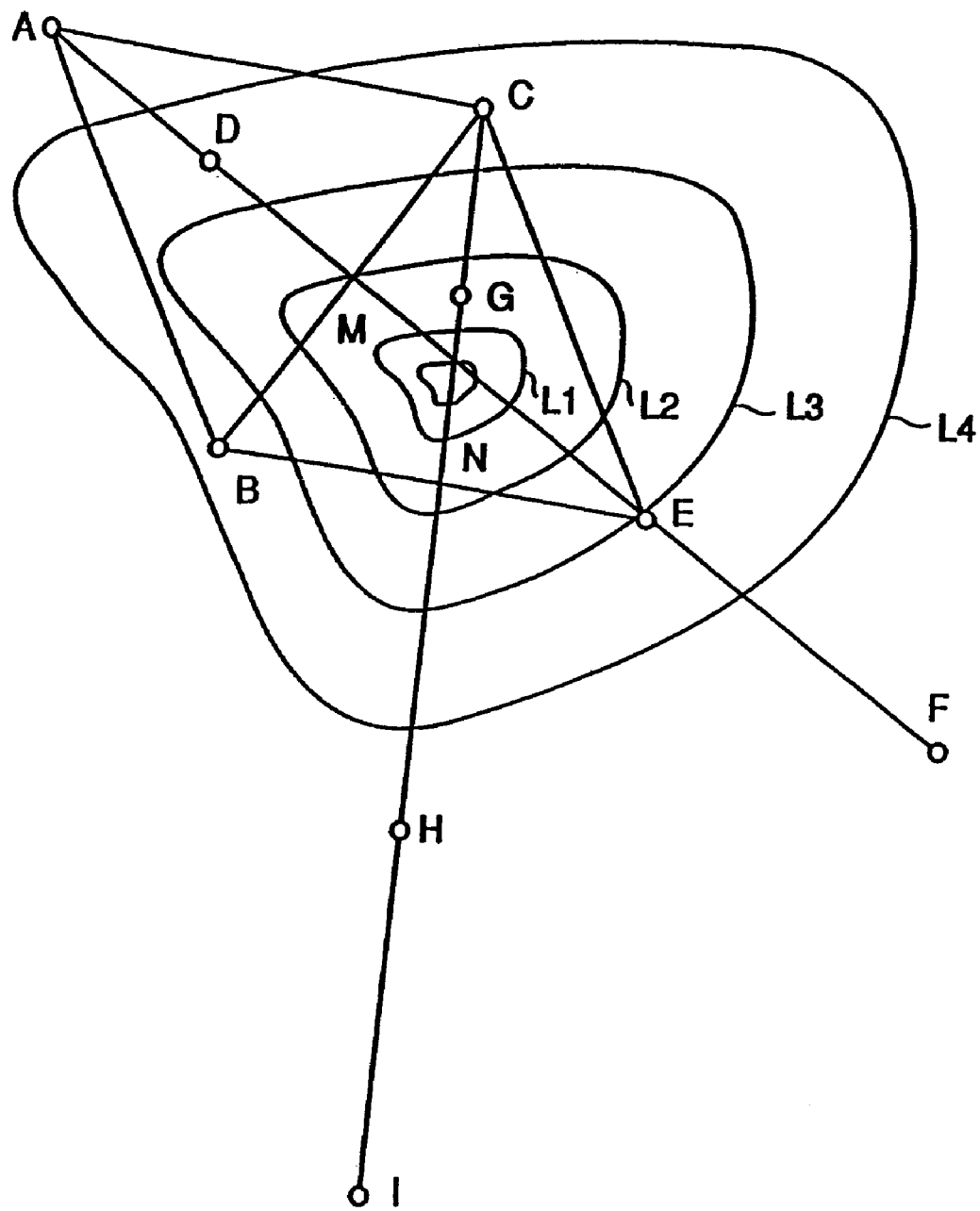
FIG. 10 depicts an illustration showing one example of a simplex method adapted as the alignment method of the laser diode chip with the optical fiber of the invention.

Hereafter, the method for detecting the optimum position of the optical fiber on the XY plane according to the simplex method will be described specifically with reference to FIGS. 10 and 11. Additionally, L1 to L4 shown in FIG. 10 depict isosteres of the light power distribution. The light power distribution shown in the FIG. 10 is set L1>L2>L3>L4.

First, a plurality of points on the XY plane, three arbitrarily set points (evaluation point) P1, P2 and P3 are selected here. For example, they are set A, B and C shown in FIG. 10, for example (step 401 shown in FIG. 11). Then, each of light quantities QP1, QP2 and QP3 of the laser light incident into the lensed fiber 8 is measured when the coupling end face of the lensed fiber 8 is moved to these set points A, B and C (step 402). Then, among the light power at the respective set points, a point P1 corresponding to the minimum light power (a point of the minimum light power: it is set A shown in FIG. 10 here, for example) is determined (step 403 shown in FIG. 11).

Subsequently, among the set points P1, P2 and P3 (A, B and C shown in FIG. 10), the set points (they are B and C here) are determined as Ps and Pt other than the point of the minimum light power (it is A here). The mid-point of a line B-C joining these set points is set M (step 404 shown in FIG. 11).

Figure 11:
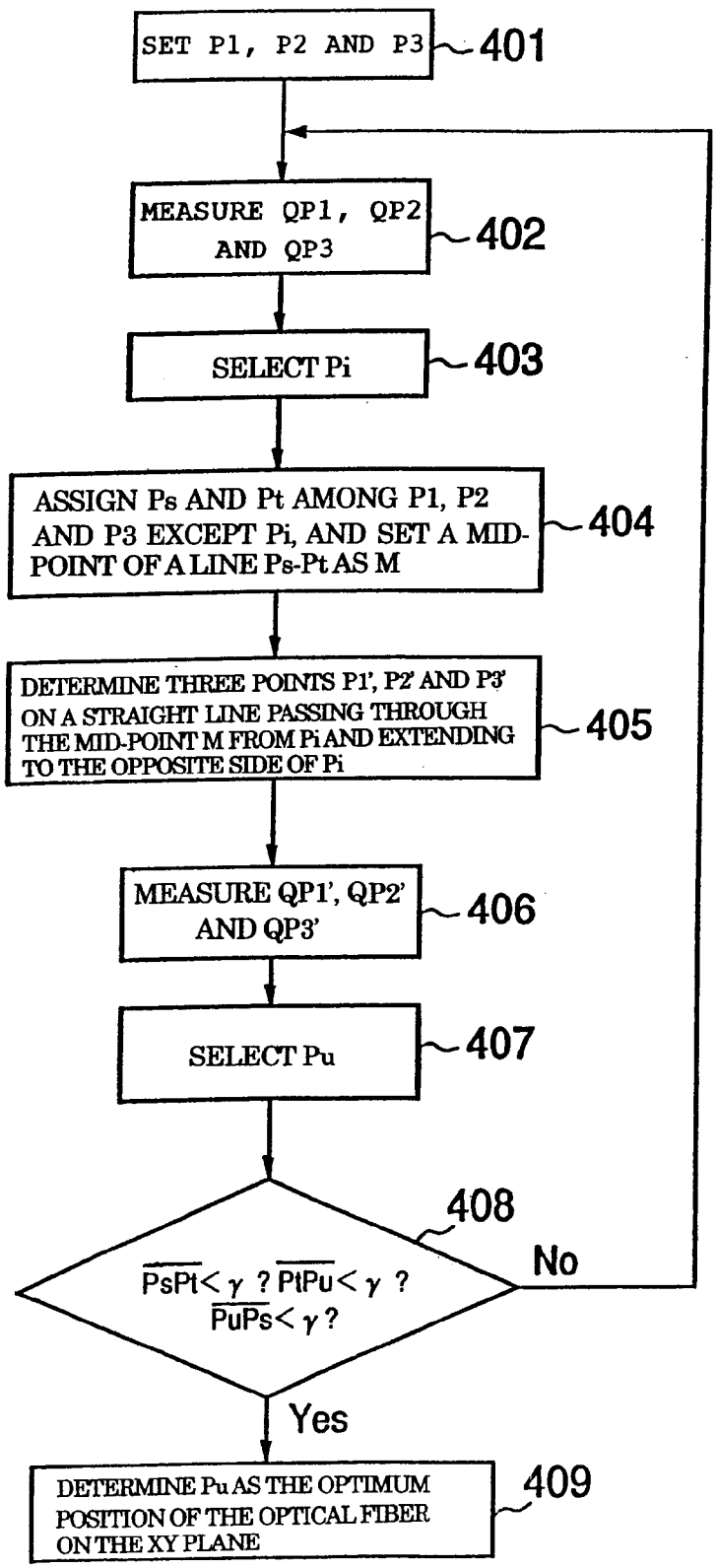
FIG. 11 depicts a flow chart illustrating an exemplary alignment operation employing the simplex method.

Then, new set points P1', P2' and P3' (they are D, E and F shown in FIG. 10) are set on a straight line that pass through this M and the point A of the minimum light power and extend to the opposite side of the point A (step 405 shown in FIG. 11). Additionally, this setting manner is done variously, but AD=0.5 AM, AE=2 AM and AF=3 AM in FIG. 10, for example.

Subsequently, the coupling end face of the lensed fiber 8 is moved to the set points D, E and F, and light power QP1', QP2' and QP3' of the laser light incident into the lensed fiber 8 are measured at each positions (step 406 shown in FIG. 11). Then, among the light power at each of the set points, a point Pu corresponding to the maximum light power (a point of the maximum light power: it is set E shown in FIG. 10 here) is determined (step 407 shown in FIG. 11).

Subsequently, in step 408 shown in FIG. 11, each of lengths of lines Ps-Pt, Pt-Pu and Pu-Ps joining the adjacent ones among the set points Ps, Pt and Pu (they are B, C, and E shown in FIG. 10) is compared with a convergence threshold γ. When each of the lengths of the lines Ps-Pt, Pt-Pu and Pu-Ps is equal to or under the convergence threshold γ, the set point Pu is defined as the optimum position of the optical fiber on the XY plane in step 409. Furthermore, when at least one length among the line Ps-Pt, Pt-Pu and Pu-Ps is equal to or above the convergence threshold γ, the operations after step 402 are repeated.

As the method for setting the optimum position of the optical fiber on the XY plane in the microalignment, the simplex method, which is one of multivariable optimization techniques as described above, is employed, whereby the optimum position of the optical fiber on the XY plane can be determined even in the case where the light power distribution of the laser diode chip 3 cannot be expressed successfully according to the quadratic function approximation.

Additionally, the laser diode module of the embodiment of the invention is configured to have a laser diode chip and an optical fiber aligned according to the alignment method of the embodiment. Therefore, the laser diode module of the embodiment is made to be a highly accurate laser diode module where the laser diode chip is accurately aligned with the optical fiber.

What is claimed is:

1. An alignment method of a laser diode chip for emitting laser light with an optical fiber for receiving the laser light comprising the steps of:

facing the laser diode chip to a coupling end face of the optical fiber;

aligning a position in a Z direction where the optical fiber is aligned with the laser diode chip at a position in a Z-axis direction of an optical axis of the laser light; and aligning a position in an XY direction where the optical fiber is aligned with the laser diode chip at a position of an X direction and a Y direction on an XY plane of an X-axis and a Y-axis orthogonal to the Z-axis, wherein the step of aligning a position in the Z direction has the steps of:

acquiring light power data at a Z position where the coupling end face of the optical fiber is moved relatively with respect to the laser diode chip in the Z-axis direction to measure a light power received by the optical fiber and light power data is acquired at every predetermined reference distance of movement, in a state that the laser diode chip is faced to the coupling end face of the optical fiber; and determining an alignment position in the Z direction where the alignment position for the optical fiber in the Z-axis direction is determined with respect to the laser diode chip based on the light power data at every predetermined reference distance of movement, and wherein the reference distance of movement is an amount of integer multiples of $(1/2)\lambda$, wherein a wavelength of laser light is set to $\lambda$.

2. The alignment method of the laser diode chip with the optical fiber according to claim 1, wherein the step of acquiring light power data at a Z position includes intermittently moving the coupling end face of the optical fiber at every reference movement in the Z-axis direction to acquire a received light power measured at an endpoint of each of the intermittent moves as light power data at every reference movement, wherein the step of aligning a position in the Z direction includes setting a position at which the coupling end face of the optical fiber is moved where a maximum light power data has been acquired or a neighboring position thereof where a received light power is much greater as an alignment position for the optical fiber in the Z-axis direction, and wherein the step of aligning a position in the Z direction includes:

confirming a start of downward trend of a value of light power data acquired at every reference movement intermittently moving the coupling end face of the optical fiber at every predetermined reference distance of movement from the confirmed position in an opposite direction in turn at time when confirming the downward trend and finding a start position of the downward trend of the value of light power data on a side of the opposite direction, setting a substantial mid-point between a position, where the downward trend of light power is confirmed on a going side and a position, where the downward trend of light power is confirmed on a returning side as a reference point; intermittently moving the coupling end face of the optical fiber by a reference movement having a value smaller than that of the reference movement in the Z-axis direction within a range of the position where the downward trend of light power is confirmed on the going side of the position where the downward trend of light power is confirmed on the returning side, centering the reference point; and setting a position where a measured light power taken at every intermittent move becomes the maximum or a neighboring position thereof where a received light power is much greater as an alignment position for the optical fiber in the X-axis direction.

3. The alignment method of the laser diode chip with the optical fiber according to claim 1, wherein the step of acquiring the light power data at Z position includes:

measuring a light power received by the optical fiber as the optical fiber is continuously moved in the Z-axis direction; and acquiring relative data between the received light power measured and a movement of the coupling end face of the optical fiber as classified data at every predetermined reference distance of movement, wherein the step of aligning a position in the Z direction includes:
determining a central value according to a predetermined method for deciding a central value at every classified data of a reference movement; and microaligning and setting an alignment position for the optical fiber in the Z-axis direction within a section of a reference movement where a central value becomes the maximum; and wherein microaligning includes determining a position at which the coupling end face of the optical fiber is moved in the Z-axis direction where a received light power becomes the maximum within a section of a reference movement where a central value becomes the maximum, and setting the determined position as an alignment position in the Z-axis direction.

4. The alignment method of the laser diode chip with the optical fiber according to claim 1, wherein an alignment method of a laser diode chip for emitting laser light with an optical fiber for receiving the laser light comprising the steps of:

facing the laser diode chip to a coupling end face of the optical fiber, aligning a position in a Z direction where the coupling end face of the optical fiber is aligned with the laser diode chip at a position in a Z-axis direction of an optical axis of the laser light; and aligning a position in a XY direction where the optical fiber is aligned with the laser diode chip at a position of an X direction and a Y direction on an XY plane of an X-azis and a Y-axis orthogonal to the Z-axis, wherein the step of aligning a position in the XY direction has the steps of:

acquiring light power data at an XY position where a light power received by the optical fiber is measured as the coupling end face of the optical fiber is moved relatively with respect to the laser diode chip following a whirl-shaped trace from a starting point to outward on the XY plane and light power data is acquired, in a state that the laser diode chip is faced to the coupling end face of the optical fiber, and setting an alignment position in the XY direction were an alignment position for the optical fiber in the XY direction is defined with respect to the laser diode chip based on the light power data acquired.

5. The alignment method of the laser diode chip with the optical fiber according to claim 4, wherein the whirl-shaped trace traveled by the coupling end face of the optical fiber is a rectangular whirl-shaped traveling trace where a movement in a long axis direction (Y-axis) is greater than a movement in a short axis direction (X-axis) in an elliptic beam pattern of the laser light emitted from the laser diode chip.

6. The alignment method of the laser diode chip with the optical fiber according to claim 4, wherein the step of setting an alignment position in the XY direction includes setting a moved position where a received light power becomes the maximum as an alignment position in the whirl-shaped traveling trace.

7. The alignment method of the laser diode chip with the optical fiber according to claim 5, wherein the step of acquiring light power data at the XY position includes acquiring a received light power measured at every step movement, according to intermittent step move where an amount of a step moved in a long axis direction is made greater than an amount of a step moved in a short axis direction, and the step of setting an alignment position in the XY direction includes setting a step moved position where a maximum received light power among received light power acquired at every step movement has been acquired or a neighboring position thereof where a received light power is much greater as an alignment position.

8. The alignment method of the laser diode chip with the optical fiber according to claim 7, including:

giving thresholds for received light power at a plurality of stages where a value of the thresholds becomes sequentially greater, alternatively performing operations of the step of acquiring light power data at an XY position and the step of setting an alignment position in the XY direction;

deciding a step moved position where a maximum received light power acquired in the whirl-shaped traveling trace exceeds a threshold at a first stage as a first alignment position;

then step moving the coupling end face of the optical fiber in a whirl shape as the first alignment position is used as a starting position and acquiring a received light power at every step movement;

deciding a step moved position where a maximum received light power among received light power acquired exceeds a threshold at a subsequent stage as a second alignment position;

then repeating operations of acquiring received light power and deciding an alignment position such that the coupling end face of the optical fiber is step moved in a whirl shape as the second alignment position is used as a starting position and a received light power is taken; and setting a step moved position of the coupling end face of the optical fiber when a value of a maximum received light power acquired exceeds a threshold at a final stage or a neighboring position thereof where a received light power is much greater as an alignment position in the XY direction.

9. The alignment method of a laser diode chip with the optical fiber according to claim 4 further including the step of microaligning a position in the XY direction performed after the step of setting an alignment position in the XY direction, the step of microaligning a position in the XY direction comprising the following steps of: setting an alignment position setting by the operation of the step of aligning a position in the XY direction as a rough alignment position and using the rough alignment position as an origin on the XY plane to set a plurality of point positions around the origin; moving the coupling end face of the optical fiber to the origin and each of the set point positions to measure and acquire a light power received by the optical fiber at each position: approximating a light power distribution in the X-axis direction and a light power distribution in the Y-axis direction to quadratic functions, respectively, based on a value of a received light power acquired at each position; and setting microalignment positions in the X-axis direction and the Y-axis direction based on the respective quadratic functions in the X-axis direction and the Y-axis direction.

10. The alignment method of the laser diode chip with the optical fiber according to claim 9, wherein the point positions set around the origin are to be five-point positions including a point position on a positive side on the X-axis centering the origin, a point position on a negative side on the X-axis, a point position on the positive side on the Y-axis passing through the origin, a point position on a negative side on the Y-side and the origin.

11. The alignment method of the laser diode chip with the optical fiber according to claim 9, wherein point positions on positive and negative sides on the X-axis centering the original are given at positions having an equal distance from the origin, and point positions on positive and negative sides on the Y-axis centering the origin are given at positions having an equal distance from the origin, where distance from the original for a position give on the Y-axis is shorter than distance from the origin for a position given on the X-axis.

12. The alignment method of the laser diode chip with the optical fiber according to claim 9, including: setting a multinational approximate expression expressing a light power distribution on the XY plane by a function of X and Y position coordinates based on values of received light power measured at a plurality of point positions given on the XY plane; and giving an X position coordinate of a maximum received light power in the X-axis direction and a Y position coordinate of a maximum received light power in the Y-axis direction determined by using a quadratic approximate expression as values of X and Y in the multinomial approximate expression and determining a value of light power according to the multinational approximate expression, wherein when a difference between the value of light power determined by the multinomial approximate expression and a value of a maximum received light power in X and Y coordinate positions determined by the quadratic approximate expression on the XY plane reaches within a predetermined allowable range, the X an Y coordinate positions are determined as a microalignment position in the X-axis direction and the Y-axis direction.

13. The alignment method of the laser diode chip with the optical fiber according to claim 4 further including:

the step of microaligning a position in the XY direction performed after the step of aligning a position in the XY direction, the step of microaligning a position in the XY direction is an operation step according to the simplex method.

14. The alignment method of the laser diode chip with the optical fiber according to claim 9, wherein alignment of the coupling end face of the optical fiber has an order of performing aligning a position in the XY direction, then performing aligning a position in the Z-axis direction and further performing aligning a position in the XY direction, wherein at time when aligning a position in the XY direction performed after aligning a position in the Z-axis direction, a step movement in moving the coupling end face of the optical fiber in a whirl shape is set smaller than that at time when aligning a position in the XY direction performed before aligning a position in the Z-axis direction.

15. An alignment apparatus of the laser diode chip for emitting laser light with an optical fiber for receiving the laser light comprising:

a placement part for a laser diode chip for placing the laser diode chip;

a placement part for an optical fiber for placing the optical fiber;

a moving unit capable of relatively moving a side of the laser diode chip and a side of the optical fiber in three orthogonal axis directions of an X-axis, a Y-axis and a Z-axis, setting an optical axis direction of the laser light as the Z-axis direction;

an algorithm storage part for storing algorithm for an alignment method of the laser diode chip with the optical fiber; and a control part for controlling move of the moving unit in accordance with the algorithm storage part stores algorithm for an alignment method of a laser diode chip with an optical fiber according to claim 1.

16. The laser diode comprising a laser diode chip and an optical fiber, both aligned by the alignment method according to claim 1.

* * * * *